(12) United States Patent  
Landers, Jr. et al.

(10) Patent No.: US 7,828,211 B2
(45) Date of Patent: Nov. 9, 2010

(54) ELECTRONIC INVENTORY TRACKING SYSTEM

(75) Inventors: John David Landers, Jr., Raleigh, NC (US); David John Steiner, Raleigh, NC (US); Paul Morton Wilson, Cary, NC (US); Kimberly Ann Wood, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 11/948,653

(22) Filed: Nov. 30, 2007

(65) Prior Publication Data

US 2009/0140046 A1    Jun. 4, 2009

(51) Int. Cl.
    *G06F 19/00*    (2006.01)
(52) U.S. Cl. ..................... 235/385; 235/492
(58) Field of Classification Search ............. 235/385, 235/451
    See application file for complete search history.

(56) References Cited

U.S. PATENT DOCUMENTS

| | | | |
|---|---|---|---|
| 5,287,266 A * | 2/1994 | Malec et al. ............ | 705/1.1 |
| 5,729,697 A | 3/1998 | Schkolnick et al. | |
| 6,032,127 A | 2/2000 | Schkolnick et al. | |
| 6,659,344 B2 | 12/2003 | Otto et al. | |
| 6,997,382 B1 | 2/2006 | Bhri | |
| 7,178,719 B2 | 2/2007 | Silverbrook et al. | |
| 7,225,980 B2 | 6/2007 | Ku et al. | |
| 2004/0065732 A1 | 4/2004 | Berndts et al. | |
| 2007/0143188 A1* | 6/2007 | Kelley et al. ............ | 705/26 |
| 2007/0235532 A1 | 10/2007 | Lapstun et al. | |
| 2008/0237339 A1* | 10/2008 | Stawar et al. ............ | 235/383 |

* cited by examiner

*Primary Examiner*—Seung H Lee
*Assistant Examiner*—Christopher Stanford
(74) *Attorney, Agent, or Firm*—Jason O. Piche; Jeffrey L. Streets

(57) ABSTRACT

Systems and methods are disclosed for tracking items in a shopping cart using radio frequency identification. In one embodiment, a first set of items is positioned in a first item zone alongside an aisle. An electronic tag reader is capable of remotely reading identification tags on the items into an electronic record of shopping cart contents when the identification tags are within a readable range from the electronic tag reader. An energy field generator such as an electromagnetic field generator generates a first electromagnetic field extending from a location within the readable range of at least some of the items in the first item zone to a location outside the readable range of any of the items in the first item zone. The tag reader is movable along the aisle into and out of the first electromagnetic field, and is configured to not read the identification tags into the electronic record while the tag reader is within the first electromagnetic field and to selectively read the identification tags into the electronic record when the tag reader is outside the first electromagnetic field.

20 Claims, 5 Drawing Sheets

ELECTRONIC INVENTORY TRACKING SYSTEM

BACKGROUND OF THE INVENTION

1. Field of the Invention

The present invention relates to tracking inventory. In particular, the invention relates in part to tracking selected items in a shopping cart at a store.

2. Description of the Related Art

Within supply chain management, there is considerable interest in supplementing or replacing the current UPC (Universal Product Code) scheme used to uniquely identify and track inventory items. The current UPC scheme employs a barcode symbology that allows each item to be scanned in, typically at checkout, with an optical scanner. Information contained with the barcode is cross-referenced with an electronic database containing price information for the associated item. This approach has largely replaced older methods of manually typing in the price of each item on a cash register. Individually tagging items with UPC barcodes can reduce incidences of lost, stolen, or spoiled goods, improve the efficiency of demand-driven manufacturing and supply, facilitate the profiling of product usage, and improve the customer experience. However, one disadvantage of item tracking using the UPC scheme is that reading a barcode requires an optical line-of-sight to a UPC scanner, and in some cases appropriate orientation of the bar code relative to the scanner. Also, items with barcodes must be scanned one item at a time. Damage to even a relatively minor portion of the bar code can prevent successful detection and interpretation of the bar code.

Various item-tracking solutions using radio frequency identification (RFID) tags have been proposed as a substitute for using bar codes in supply chain management generally, and particularly in supermarket checkout systems. Proposed RFID-based scanning systems in retail environments typically involve an active scanning device that reads a passive RFID tag affixed to each item. RFID scanners are capable of multi-directional reading of RFID tags from a distance, allowing RFID tracking systems to remotely scan for multiple items in the vicinity of the scanner. Efforts to implement conventional RFID-based scanning systems have, therefore, largely been directed to scanning an entire shopping cart full of items at once, in an effort to save time over the traditional checkout process where item bar codes are manually scanned in one at a time. However, difficulties have arisen in obtaining an accurate accounting of shopping cart contents, due primarily to the size and volume of a typical shopping cart. One difficulty is that items near the center of a typically-sized shopping cart are not reliably detectable with an RFID scanner using existing technology. Furthermore, such solutions still occupy substantial amounts of floor space and overhead.

Despite the shortcomings of previously-proposed RFID-based product scanning systems, however, RFID technology remains a useful tool with a great deal of development potential in supply chain management, inventory management, and, in particular, for expediting checkout at supermarkets and other shopping venues. Therefore, an improved RFID-based inventory scanning solution is desired. The solution would preferably avoid the shortcomings of previously attempted RFID-based systems, such as the inability of known systems to reliably scan an entire shopping cart.

SUMMARY OF THE INVENTION

One embodiment provides a system, wherein a first set of items is positioned in a first item zone. Each item in the first set of items has a machine-readable identification tag. An electronic tag reader is capable of remotely reading the identification tags into an electronic record of shopping cart contents when the identification tags are within a readable range from the electronic tag reader. An electromagnetic field generator is configured to generate a first electromagnetic field extending from a location within the readable range of at least some of the items in the first item zone to a location outside the readable range of any of the items in the first item zone. The tag reader is movable along the aisle into and out of the first electromagnetic field, and is configured to not read the identification tags into the electronic record while the tag reader is within the first electromagnetic field and to selectively read the identification tags into the electronic record when the tag reader is outside the first electromagnetic field.

Another embodiment provides a method that includes positioning a first set of items in a first item zone. Each item in the first set of items has a machine-readable identification tag. The method further includes generating a first electromagnetic field extending from a location within the readable range of at least some of the items in the first item zone to a location outside the readable range of any of the items in the first item zone. The tag reader is moved along the aisle into the first electromagnetic field and the identification tags are not read into the electronic record while the tag reader is within the first electromagnetic field. The tag reader is then moved out of the first electromagnetic field, after which the identification tags are selectively read into the electronic record when the tag reader is outside the first electromagnetic field.

Other embodiments, aspects, and advantages of the invention will be apparent from the following description and the appended claims.

DETAILED DESCRIPTION OF PREFERRED EMBODIMENTS

The invention provides systems and methods for tracking inventory items, such as in a supermarket. In one embodiment, items in a shopping cart are periodically scanned using an RFID tag reader on the shopping cart or in a handheld device (e.g. cell phone or PDA) carried with or near a shopper. The electronic record may reside, for example, in electronic memory, such as on-board memory of the RFID reader or computer memory residing on a computer network in communication with the RFID reader. The contents of the shopping cart are updated in an electronic record to include the scanned items. The electronic record may be used to expedite checkout and payment, as well as to provide suggestive selling as to related products. Sets of items may be placed in associated item zones, and a distinct detectable energy field such as an RF field is generated at each item zone. The RF field extends outside the readable range of any items in the associated item zone. As a shopping cart is moved into an RF field of a particular item zone, the shopping cart RFID tag reader detects the RF field, and items associated with the respective item zone are not scanned into the electronic record. When the shopping cart is moved out of the RF field, items from the associated item set may then be scanned into the electronic record. Accordingly, items in the shopping cart are still in readable range of the shopping cart RFID tag reader, and these items will be scanned and added to the electronic record, while non-selected items remain in the item zone and are not scanned because they are now out of the readable range. Similarly, an RF field may be generated around each shopping cart by a shopping cart RF transmitter, and RFID scanning from one cart may be disabled when in the presence of the RF field generated by another cart, so that items from one cart are not inadvertently added to the electronic record of items in another cart.

Figure 1:
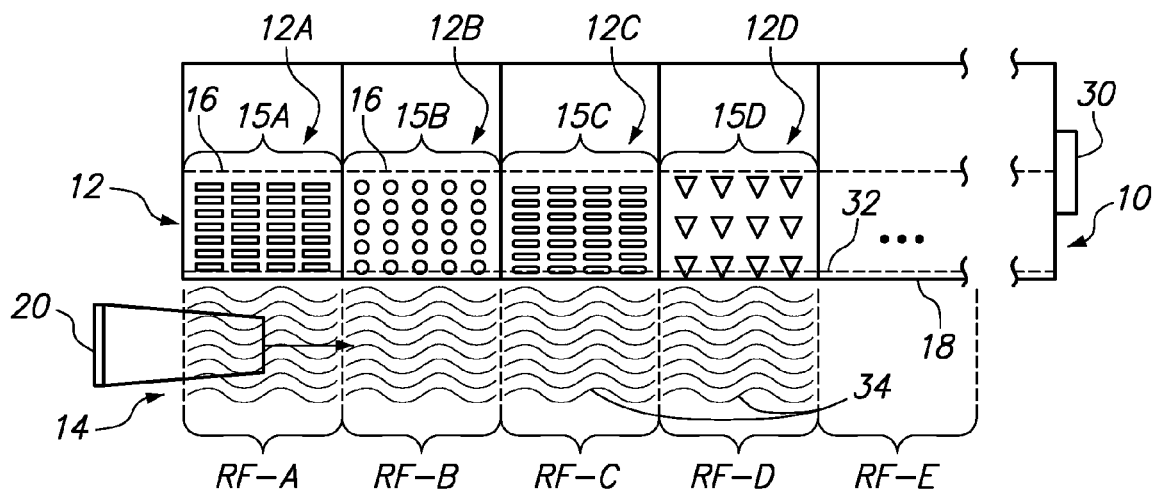
FIG. 1 is a plan view of an inventory tracking system according to one embodiment of the invention.

FIG. 1 is a schematic plan view of an inventory tracking system 10 according to one embodiment of the invention. The system 10 may be implemented, for example, at a supermarket that stocks a large variety of different goods. The goods can be uniquely tracked and accounted for while shopping using RFID tags or other remotely machine-readable identification devices. A plurality of item zones, generally indicated at 12, include exemplary item zones 12A, 12B, 12C, 12D, which are positioned to form an aisle 14. Each item zone 12 can be used to group a set of for-sale inventory items, and a different item set 15 may be stocked in each item zone 12. For example, item set 15A is stocked in item zone 12A, and item set 15D is stocked in item zone 12D. Accordingly, each item set may be physically associated with an item zone by physically present in the item zone, and each item set may also be logically associated with an item zone by informing a system controller which item set is being placed in which item zone. Although not required, each item set 12 in this embodiment includes like items. For example, one item zone 12 may contain a plurality of ketchup bottles of a particular brand and size, another item zone may contain a particular brand and size of mustard, and yet another item zone may contain a particular brand and size of relish. Accordingly, like items in a particular item zone may all be the same price. Characteristics of the items (e.g. brand, size, and price) may be encoded in a remotely machine-readable device, such as an RFID tag, and selectively read (i.e. "scanned") by an RFID tag reader.

Each item zone 12 in this embodiment is optionally defined by a respective one of a plurality of bins 16 on a supermarket shelf 18. The term "bin" as used herein is intended to encompass not only an open-top container, but also any basket, container, case, or other item holder used to contain or hold each item set in its respective item zone. However, the use of bins and shelves is not required. For example, the item zones 12 could instead be areas of a supermarket floor or a supermarket wall demarcated with paint, tape, or other marking system that would aid stockers in visually determining where to place the different item sets. The use of bins 16 provides a convenient way to keep the different item sets 15 separate both organizationally and visually, such as to assist stockers with stocking items in their respective bins and to aid shoppers in selecting items. The bins 16 and shelf 18 also provide a structural framework for some electronic components of the inventory system 10, as discussed further below. A shopping cart 20 is configured for moving along the aisle 14, typically by rolling the shopping cart along the floor within the aisle 14. A shopper can push the shopping cart 20 along the aisle 14 and select items from the various item zones 12.

As will be explained in detail, the inventory tracking system 10 keeps track of which items the shopper has selected and taken from the various item zones 12 by selectively scanning items in the shopping cart 20 into an electronic record, without scanning into the electronic record the items that remain on the shelf 18 in their respective item zones 12 or in another shopper's cart. An electromagnetic field generator 30 included with the inventory tracking system 10 generates one or more machine-detectable electromagnetic fields 34 in front of each item zone 12. The electromagnetic field generator 30 is indicated in the schematic plan view as a single, representative box. However, the representative box is not intended to limit the electromagnetic field generator to a single piece of electronic hardware. Rather, the electromagnetic field generator 30 may either refer to a single hardware device is configured to generate a different RF field in each item zone, or the electromagnetic field generator 30 may collectively include a group of hardware components such as individual RF generators. For example, the electromagnetic field generator 30 may include a separate hardware device for each item zone, each capable of generating the RF field for that zone. In this embodiment, electrical wiring 32 in electrical communication with the electromagnetic field generator 30 is routed along the shelf 18, and the wiring 32 emits the electromagnetic field adjacent to each item zone 12. The wiring 32 acts as an antenna for the electromagnetic field generator 30.

Generally, the term "RF" is used herein to include any electromagnetic field from very low frequency (e.g., RF used for communication between submarines) to Gamma rays, which are forms of electromagnetic radiation (EMR) or light emissions of a specific frequency produced from sub-atomic particle interaction, such as electron-positron annihilation and radioactive decay. RF can be largely distinguished according to its frequency. For example, light is a form of RF at a wavelength that it is detectable to the human eye. One skilled in the art might use the term RF to describe a range of frequencies that typically penetrate solid objects so the field itself is not blocked (or attenuated). There are practical limits and considerations, however, to which types and frequencies of RF may be selected for use in this embodiment. For example, the RF generated radioactively by plutonium could be used to implement the invention, but the radiation produced by plutonium is really a very high energy electromagnetic field that would be impractical. Furthermore, the invention is not limited to the use of electromagnetic fields, and virtually any detectable energy field could be used in place of the electromagnetic fields. For example, ultrasonic generators could be positioned to generate generated detectable acoustic fields, or magnets could be positioned to generate detectable magnetic fields. The term RF is therefore considered herein to also include electromagnetic fields.

In this embodiment, each electromagnetic field is a distinct RF field, each designated with a letter corresponding to the associated item zone 12. For example, the electromagnetic field generator 30 generates an electromagnetic field "RF-A" in front of item zone 12A, an electromagnetic field "RF-B" in front of item zone 12B, and so forth. Accordingly, each RF field is physically associated with an item zone by being in close proximity between the RF field and the item zone, and each RF field may also be logically associated with the item zone by informing a system controller which RF field is in close proximity to which item zone. Each RF field RF-A, RF-B, etc. in this embodiment also includes at least one detectably distinct characteristic. For example, each RF field may be on a different frequency or amplitude than the other RF fields. Alternatively, each RF field may contain other identifying information used to differentiate one RF field from another RF field, such as by having a unique digital ID encoded in each RF field. Using existing RF field generation means, the different RF fields may be precisely controlled so that, for example, each RF field extends only a short distance into the aisle 14 from its respective item zone 12. For example, radio frequency transmitters and antenna systems known in the art may be used to generate a controlled RF field that extends a short distance into the aisle 14, such as between two inches to no more than four feet into the aisle 14. The antenna design may also be used to determine the shape and intensity of the RF field. Existing RF field generation techniques may also be used to control the RF fields with enough precision that the RF fields do not appreciably intersect with one another, thereby creating tightly controlled boundaries between distinct RF fields. A determination of whether or not adjacent RF fields intersect could be made according to the resolution of the RF field detector, rather than a determination of literal intersection. For example, an RF fields may decay or diminish as a function of distance from the respective RF field generator to a level that is below a predefined threshold level by the RF field detector or other tag reader at a certain distance. Thus, portions of two RF fields are considered not to intersect, even if they literally intersect, so long as the portion of the RF fields above the detection threshold level of the RF detector do not intersect. The shopping cart 20 may be moved down the aisle 14 into and out of the various RF fields. For example, the shopping cart 20 is currently shown with its front end in RF-A, and may be rolled down the aisle 14 in the direction shown to move the shopping cart 20 out of RF-A and into RF-B, out of RF-B and into RF-C, and so forth.

Figure 2:
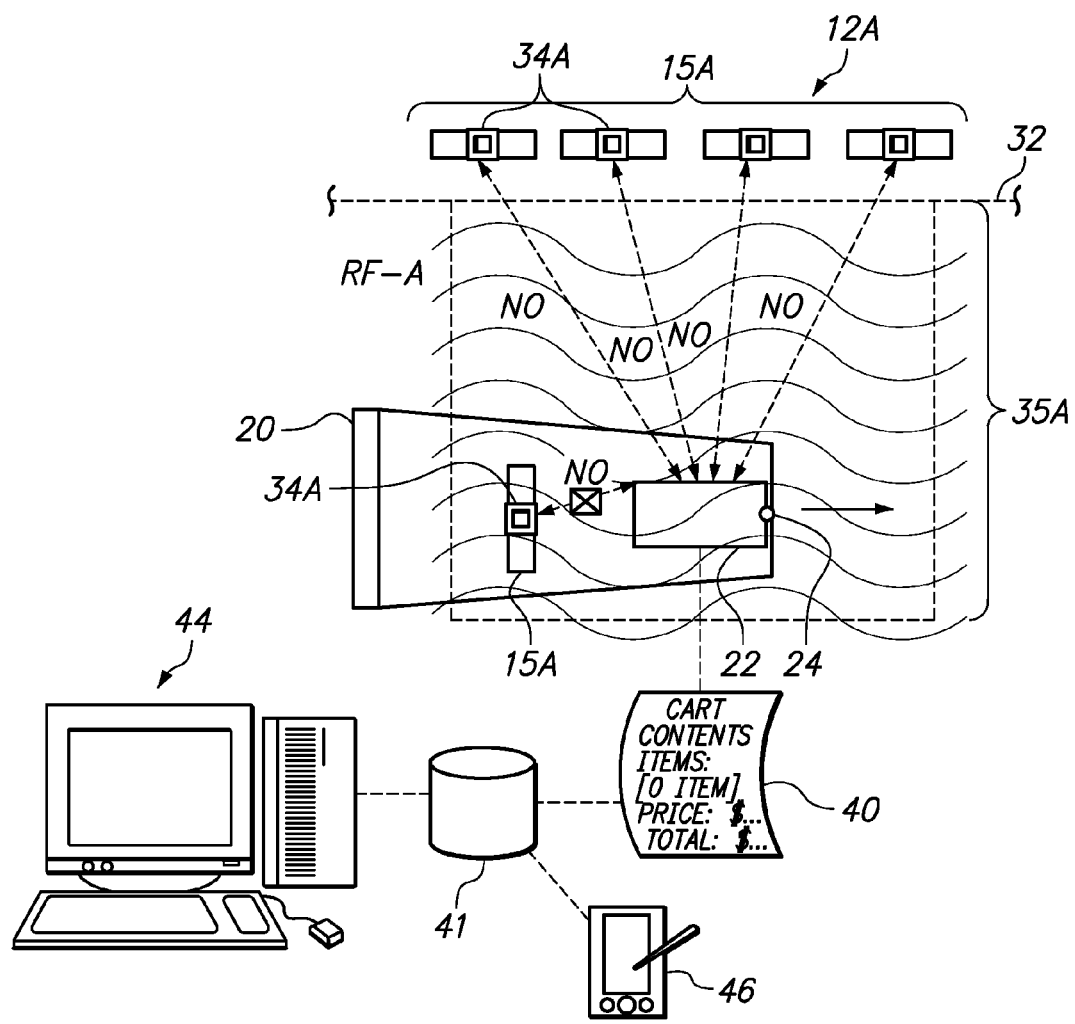
FIG. 2 is a plan view of the shopping cart as positioned in one item zone associated with RF field "RF-A."

FIG. 2 is a plan view of the shopping cart 20 as positioned in RF-A in front of item zone 12A. One of the items from item set 15A has been removed from item zone 12A and placed in the shopping cart 20. Each item from item set 15A includes a remotely machine-readable identification device 34A, which in this embodiment is a radio-frequency identification ("RFID") tag. The invention also encompasses alternative embodiments using remotely machine-readable identification devices other than RFID tags, whether such technology now exists or is later developed. As previously mentioned, RFID tags have the advantage of being remotely and omni-directionally readable. Each tag 34A may include identifying information indicating shared characteristics of items in item set 15A, such as brand, size, and price. The identifying information may also include information to differentiate items within the item set 15A, such as a serial number to distinguish one item having a particular brand, size, and price from another identical item having the same brand, size, and price.

An electronic tag reader 22 is disposed in the shopping cart 20. The electronic tag reader 22 may be secured to the shopping cart 20, such as to prevent theft and to place the electronic tag reader 22 at a desired position relative to the shopping cart 20. In another embodiment, the electronic tag reader 22 may be portable and carried with the user in, for example, a shopper's personal electronic device 46 such as a PDA (personal digital assistant), handheld computer, or cell phone. The electronic tag reader, in this embodiment, is an RFID reader 22 configured for remotely reading the RFID tags 34A when they are in a readable range from the RFID reader 22. Each item in the item set 15A has a readable range from which its respective RFID tag 34A can be read by the RFID reader 22. When the RFID reader 22 reads one of the RFID tags 34A, it obtains the identifying information from the read RFID tag 34A, such as the item description and price, and can account for that item by adding it to an electronic record 40 of detected shopping cart contents. The electronic record 40 resides on electronic memory 41. The electronic memory 41 may be, for example, on-board memory included with the RFID reader 22, computer memory residing on a computer 44 in a network in communication with the RFID reader 22, or memory of the optional handheld device 46.

As the shopping cart 20 is pushed away from the item zone 12A it will reach a location (or range of locations) at which some of the items in the item zone 12A are in readable range of the RFID reader 22 while other items in the item zone 12A are outside of their respective readable ranges. The shopping cart 20 may be moved still further away from the item zone 12A, to a location outside of the readable range of all of the items in the item zone 12A. A collective range boundary 35A is mapped out by way of example to show the collective range of readability of items in item zone 12A. For the purpose of discussion, the RFID reader 22 is assumed to be within the readable range of at least some of the items in the item zone 12A when the RFID reader 22 is at any location inside the boundary 35A, and outside the readable range of any of the items in the item zone 12A when the RFID reader 22 is outside the boundary 35A. The shape of the boundary 35A need not be rectangular or even regularly shaped as conceptually shown here, and will probably vary depending on factors such as the positioning of the items within the item zone 12A, the positioning of the RFID tags 34A on the items 15A, and the structural layout of the shelf 18 and bins 16. The structural framework of the shelf 18 and bins 16 may be selected to control or influence the shape and size of the collective range boundary 35.

An electromagnetic field detector 24 is positioned in the shopping cart 20. More particularly, because the electromagnetic fields RF-A, RF-B, etc. in this embodiment are RF fields, the electromagnetic field detector 24 in this embodiment is an RF detector 24 configured for detecting the RF fields. The RF detector 24 may be an RF signal receiver in electronic communication with the RFID reader 22, and the RF detector 24 can communicate to the RFID reader 22 whether or not the RFID reader 22 is in RF-A. The RF detector 24 may be at a fixed location within the shopping cart 20 so that the position of the shopping cart 20 and/or the position of the RFID reader 22 may be determined with reference to the position of the RF detector 24. The RF detector 24 may be separate and spaced from the RFID reader 22, but the RF detector 24 is preferably positioned closely to (or included with) the RFID reader 22 so that when the RF detector 24 detects the presence of a particular RF field, it may be assumed that the RFID reader 22 is also present inside that RF field. The RF detector 24 may be included as a component of the RFID reader 22. Because the electronic tag reader in this embodiment is an RFID reader 22 that is already capable of receiving and interpreting radio frequencies, some of the circuitry of the RFID reader 22 that is used to read the RFID tags 34 may also act as the RF detector 24 for detecting the presence of the RF fields RF-A, RF-B, and so forth.

The RFID reader 22 is programmed not to read any item associated with the item set 15A into the electronic record 40 while the RF detector 24 detects the RF field RF-A being at or above a predefined threshold level. For example, in one configuration, the RFID reader 22 may read the RFID tags 34A but simply not enter any of the items in the item set 15A into the electronic record 40 so long as the RF detector 24 detects RF-A at a level equal to or greater than the predefined threshold level. In another configuration, the RFID reader 22 may instead be programmed to simply not read any RFID tags, or at least not any of the RFID tags 34A included with items in item set 15A, for so long as the RF detector 24 detects the RF field RF-A being at a level equal to or greater than the predefined threshold level. A logical association between item set 15A and item zone 12A may be programmed into the RFID reader 22, and the RFID reader 22 may, by virtue of that association, selectively exclude items from item set 15A from being read into the electronic record 40, while still reading items that are not associated with item set 15A while the RFID reader 22 remains inside RF-A. As a result, the RFID reader 22 will not scan any of item set 15A into the electronic record 40 while in RF-A. This prevents the RFID reader 22 from reading any of the non-selected items still on the shelf 18 in item zone 12A into the electronic record 40 of shopping cart contents for so long as RF-A is detected by the RF detector 24. Only after the shopping cart 20 has been moved outside of RF-A will the RFID reader 22 read into the electronic record 40 the item from item set 15A that the shopper has selected and placed in the shopping cart 20.

The RF detector might query a server such as the computer 44 to see if a particular item should be counted/scanned when found in a particular item zone. While it is possible to have a complete table of items and item zones stored in the RFID reader, a more practical implementation might be for the RFID reader to instead query such a database with that database being located on the server or computer 44. The query could include scanning information such as the item ID and RF field ID that the item was found in. The server (rather than the RFID reader) could then perform a table lookup to determine if the item should be scanned into the electronic record.

Figure 3:
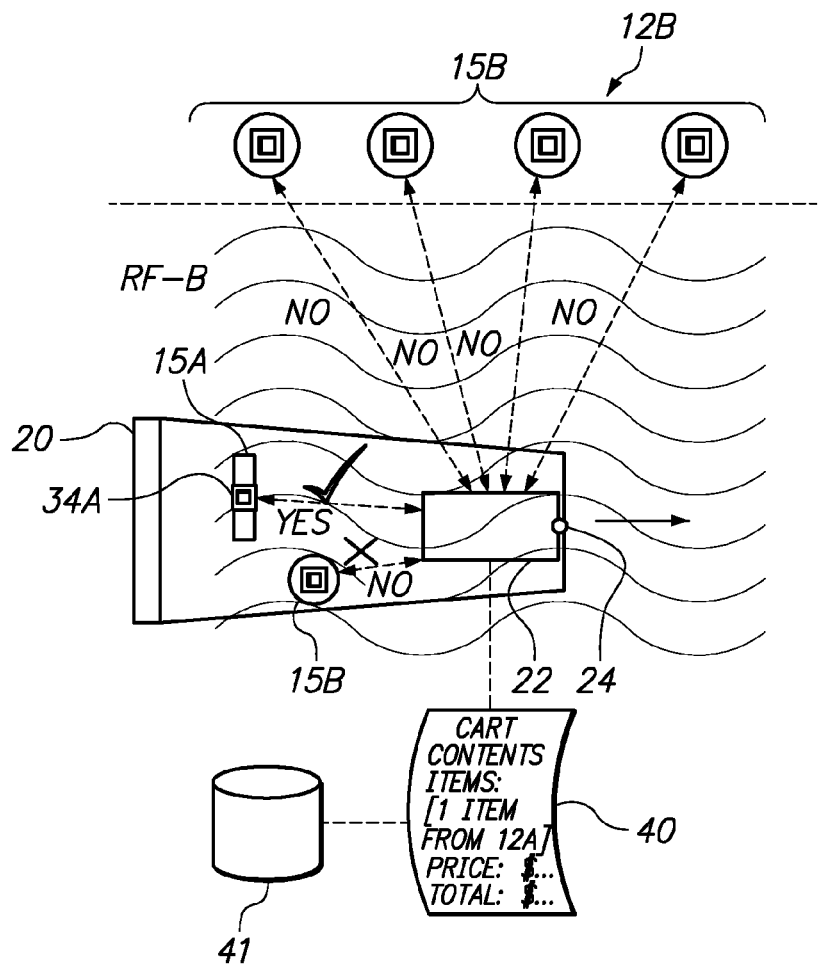
FIG. 3 is a plan view of the shopping cart having been moved down the aisle from its position in FIG. 2 to a position in front of the adjacent item zone.

FIG. 3 is a plan view of the shopping cart 20 having been moved down the aisle 14 from its position in front of item zone 12A (See FIG. 2) to a position in front of the adjacent item zone 12B. The shopping cart 20 is now outside of RF-A and inside of RF-B. When the RF detector 24 is detected as being outside RF-A, the RF detector's physical association with the RFID reader indicates that the RFID reader 22 is also outside the boundary 35A, and correspondingly outside the readable range of any of the items from item set 15A that remain in item zone 12A. However, the item from item set 15A that was placed in the shopping cart 20 is still within readable range of the RF detector 22. Thus, if the RFID reader 22 scans for items from item set 15A at this position of the shopping cart 20, the RFID reader 22 will be able to detect and read the item from item set 15A that was placed in the shopping cart 20, but not the other items from item set 15A that remain in item zone 12A. However, the RF detector 24 also detects that the RFID reader 22 is now in RF-B, and the RFID reader 22 is programmed not to read any items from item set 15B into the electronic record 40 for so long as the RFID reader remains in RF-B, by the same logic that the RFID reader 22 did not read any items into the electronic record 40 from item set 15A when the RFID reader was positioned in RF-A (FIG. 2).

Additional confirmations may be performed before an item is allowed to be stored into the electronic record 40. Still referring to FIG. 3, the detected presence of the RFID reader 22 in RF-B may be used as one confirmation that items from item set 15A that remain on the shelf 18 in item zone 12A will not inadvertently be read into the electronic record 40. Another confirmation may be provided by ensuring that the RFID reader 22 first enters an RF field and subsequently exits the RF field before items are read. For example, the RFID reader 22 may be programmed not to read any items from item set 15A into the electronic record 40 unless the RFID reader 22 first enters and then exits RF-A. This confirms that the shopper actually entered the area around item zone 12A where he or she could have taken an item from item set 15A. As an alternative to providing this confirmation, the RFID reader 22 could instead be programmed simply to scan for items in an item set when not in the presence of an associated RF field, on the assumption that the RFID reader 22, as configured, would still only detect items in the shopper's shopping cart 20.

Figure 4:
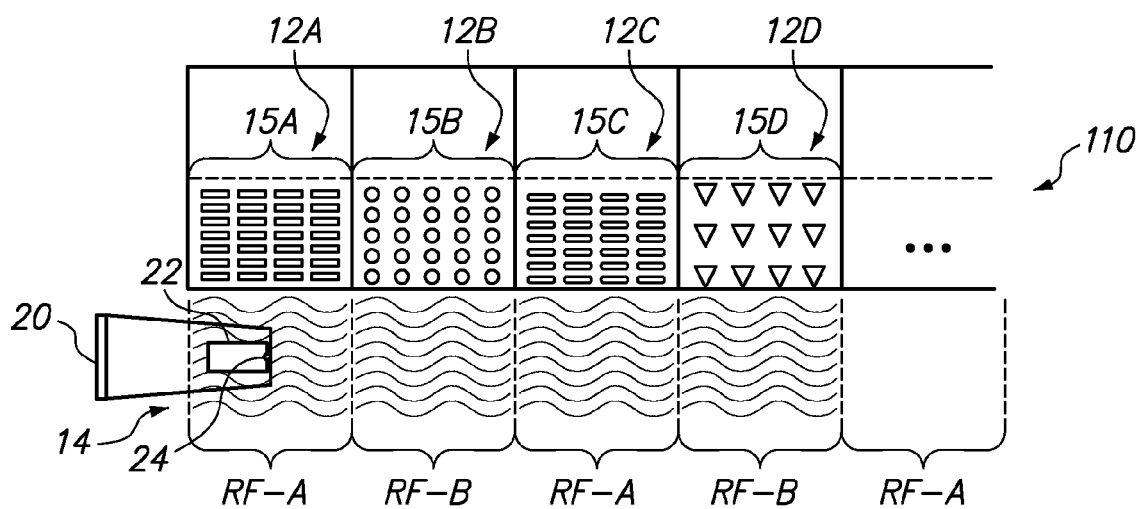
FIG. 4 is a plan view of an alternative embodiment of the electronic tracking system having alternating RF fields.

FIG. 4 is a plan view of an alternative embodiment of the electronic tracking system 110 having alternating RF fields. Whereas every RF field in FIG. 3 is unique (RF-A, RF-B, RF-C, etc.), the RF fields in FIG. 4 alternate between RF-A and RF-B. In particular, RF-A is generated at item zones 12A, RF-B is generated at item zone 12B, and RF-A is again generated at item zone 12C, and so on. An advantage of this embodiment is that fewer unique RF fields are needed. While in front of item zone 12A, the shopper may select any number of items from item set 15A in item zone 12A and place those items in the shopping cart 20. As the shopper moves the shopping cart 20 down the aisle 14 to a position in front of item zone 12B, the RFID reader 22 exits RF-A. In response to having exited RF-A (as optionally confirmed by the detection of RF-B), the RFID reader 22 may then read items other than items associated with RF-A (e.g. item sets 12A and 12C but not item sets 12B and 12D) into the electronic record 40. The shopper may then select any number of items from item set 15B (item zone 12B) and place those items in the shopping cart 20. As the shopper moves the shopping cart 20 down the aisle 14 to a position in front of item zone 12C, the RFID reader 22 exits RF-B. In response to having exited RF-B (as optionally confirmed by the detection of RF-A), the RFID reader 22 may then read items other than items associated with RF-B (e.g. item sets 12B and 12D but not item sets 12A and 12C) into the electronic record 40. The shopper may then select any number of items from item set 15C (item zone 12C) and place those items in the shopping cart 20, to be subsequently read into the electronic record 40 when the RFID reader moves back out of RF-A (either by moving the shopping cart 20 forward to in front of item zone 12D or backward to in front of item zone 12B.

Figure 5:
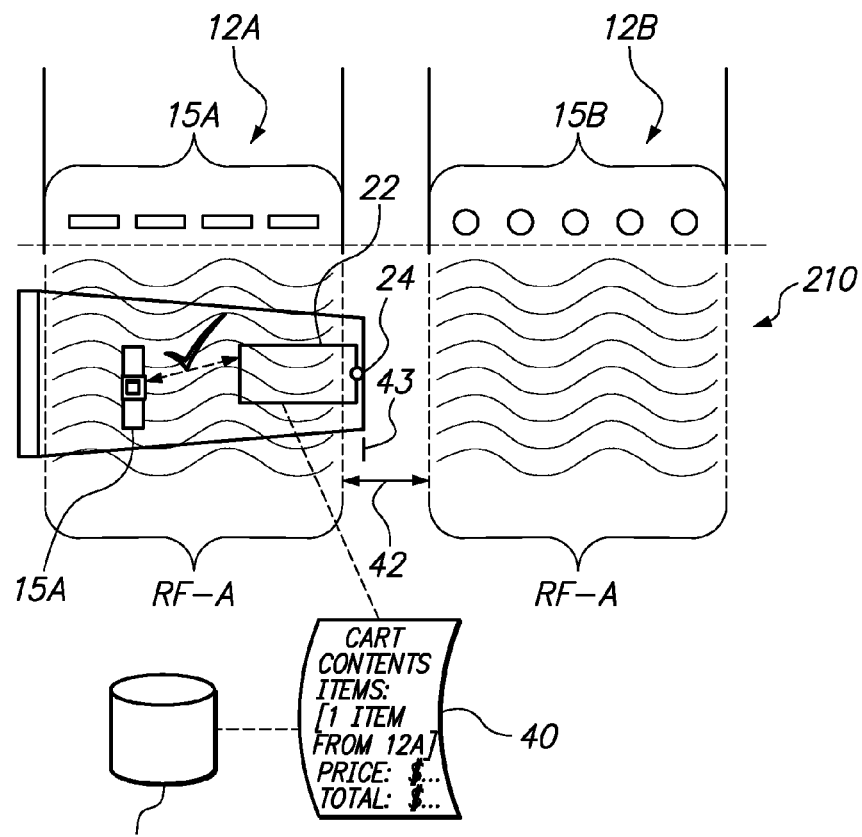
FIG. 5 is a plan view of another embodiment of the electronic tracking system wherein the same RF field is generated at every item zone, including adjacent, consecutive item zones.

FIG. 5 is a plan view of another embodiment of the electronic tracking system 210 wherein the same RF field RF-A may be generated at every item zone, including adjacent, consecutive item zones 12A and 12B. Item zones 12A and 12B are separated by a gap 42. The gap 42 ensures that as the shopping cart 20 is moved from in front of item zone 12A to in front of item zone 12B, that the RFID reader 22 will be out of RF-A when at a location 43 between item zones 12A and 12B. When the shopping cart is in RF-A in front of item zone 12A, the shopper can select items from item set 15A, and the selected items will not be scanned while the RFID reader 22 remains in front of item zone 12A, due to the RF field RF-A.

When the shopper moves the shopping cart 20 down the aisle 14 toward item zone 12B, the RFID reader 22 will traverse the gap 42 prior to reaching item zone 12B. Thus, the RFID reader 22 will scan for items when positioned at location 43 in response to detecting that the RFID reader 22 is temporarily not in RF-A at location 43. At location 43, the RFID reader 22 is outside the readable range of items from item set 15A that are still in item zone 12A. Thus, any items from item set 15A that are detected and read by the RFID reader 22 may be assumed, with reasonable certainty, to be items the shopper has selected and taken. When the shopping cart 20 reaches item zone 12B, the RFID reader 22 will once again be in the field RF-A, in response to which the RFID reader 22 will once again be precluded from reading items into the electronic record.

Figure 6:
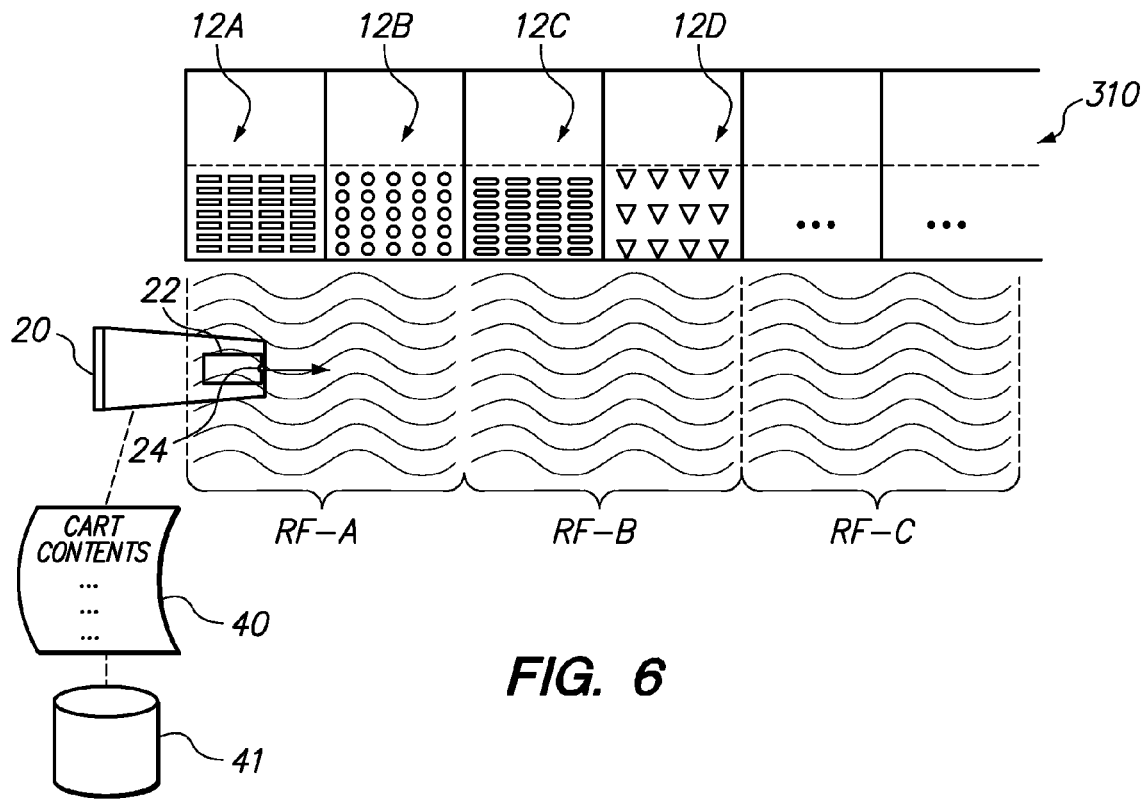
FIG. 6 is a plan view of yet another embodiment of the electronic tracking system wherein each RF field spans two item zones.

FIG. 6 is a plan view of another embodiment of the electronic tracking system 310 wherein each RF field spans two item zones. In particular, RF-A spans item zones 12A and 12B, and RF-B spans item zones 12C and 12D. The RFID reader 22 contains a programmed logical association between RF-A and each of item zones 12A and 12B, and a programmed logical association between RF-B and each of item zones 12C and 12D. These logical associations may be stored, for example, in a database, lookup table or other type of listing. The RFID reader 22 will refrain from reading items from item zones 12A or 12B into the electronic record 40 while the RF detector 24 detects RF-A, but may read items from item zones 12A and 12B into the electronic record 40 any time that the RF detector 24 does not detect RF-A (which, again, may be confirmed by the detection of an RF field other than RF-A). Likewise, the RFID reader 22 will refrain from reading items from item zones 12C or 12D into the electronic record 40 while the RF detector 24 detects RF-B, but may read items from item zones 12C and 12D into the electronic record 40 any time that the RF detector 24 does not detect RF-B. Thus, as illustrated in this embodiment, a single RF field may spans multiple item zones.

Figure 7:
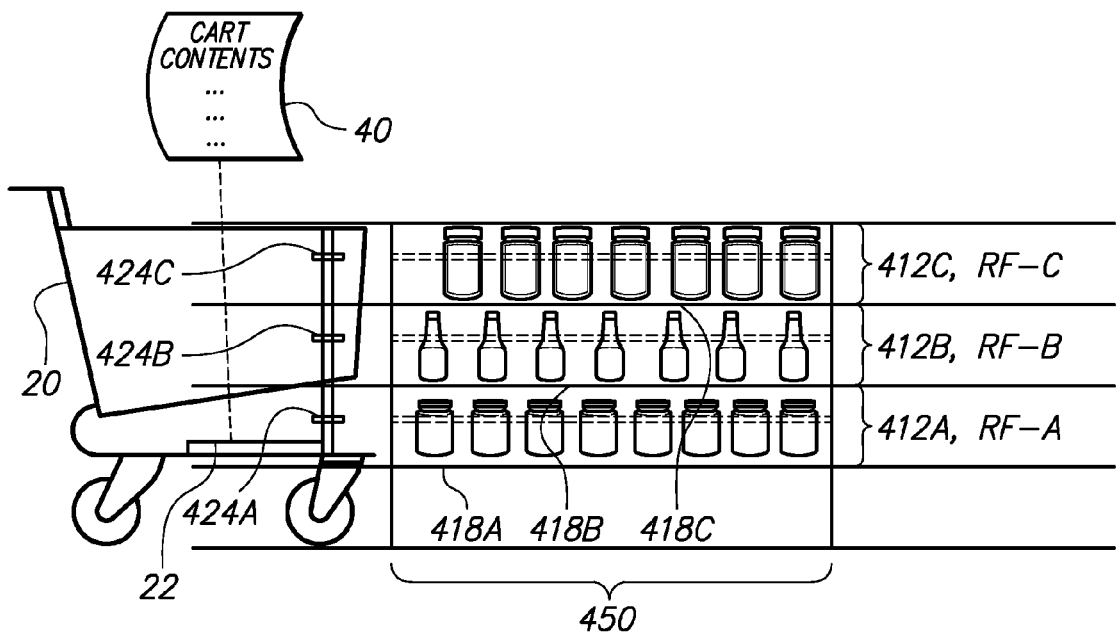
FIG. 7 is an elevation view of a further embodiment of the electronic tracking system having a plurality of vertically arranged item zones.

FIG. 7 is an elevation view of another embodiment of the electronic tracking system 410, having a plurality of vertically arranged item zones 412A, 412B, and 412C. The shopping cart 20 includes a multi-tiered RF detector 424, including a first detector element 422A positioned within the elevation of the first item zone 412A, a second detector element 422B positioned within the range of elevation of the second item zone 412B, and a third detector element 422C positioned within the range of elevation of the third item zone 412C. The detector elements 422A-C are in electronic communication with the RFID reader 22. RF fields RF-A, RF-B, and RF-C may be generated at each of item zones 412A, 412B, and 412C, respectively, and may extend slightly vertically above and below each of the respective item zones. The three item zones 412A-C may represent, for example, the area of three shelves 418A, 418B, and 418C where items may be stacked. Thus, while the shopping cart 20 is in front of section 450 of aisle 14, detector element 422A detects RF-A, detector element 422B detects RF-B, and detector element 422C detects RF-C, and the RFID reader 22 therefore refrains from reading items on shelf 418A, 418B, and 418C, respectively, into the electronic record 40. After the shopping cart 20 has been moved down the aisle 14 and out of section 450, any items from shelves 418A, 418B, or 418C that were placed into the shopping cart 20 may be read into the electronic record 40 by the RFID reader 22.

Figure 8:
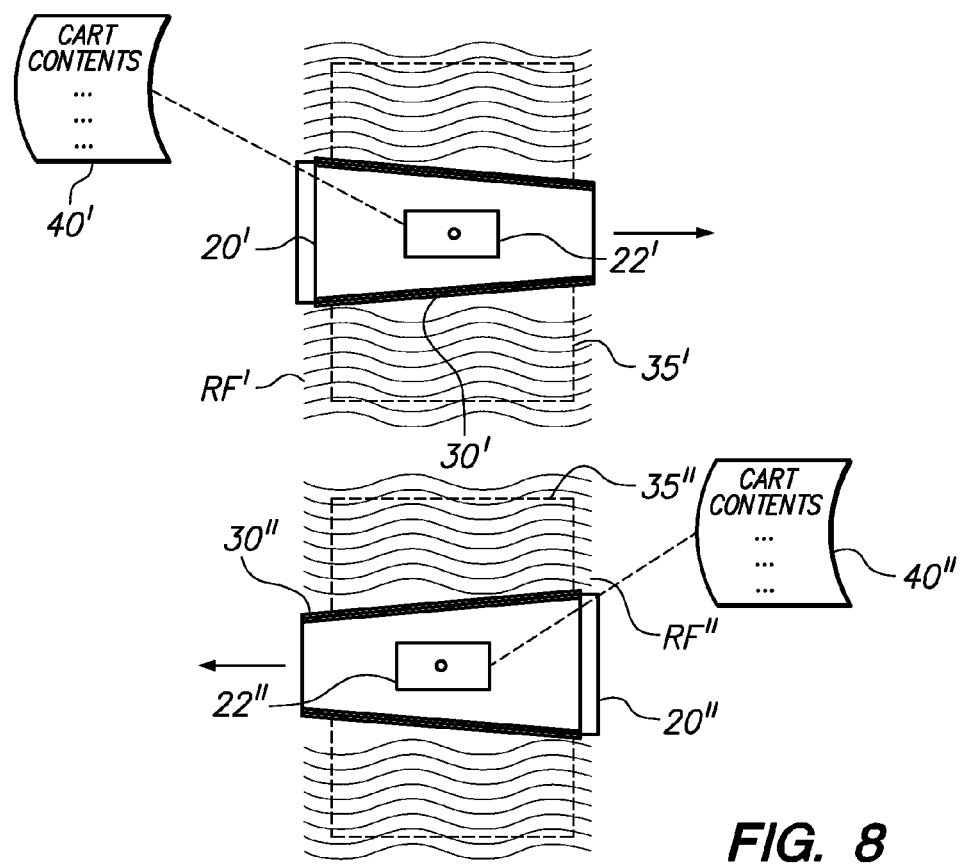
FIG. 8 is a plan view illustrating how the RFID reader in one shopping cart is configured to selectively refrain from reading items in another shopping cart.

FIG. 8 is a plan view illustrating how the RFID reader 22' in one shopping cart 20' may be configured to refrain from reading items in another shopping cart 20", and vice-versa. The shopping cart 20' has an RF generator 30' that emits an RF field RF' that extends to or beyond a readable range 35' of the contents of the shopping cart 20'. Alternatively, the RF generator 30' could be built into or included with the RFID reader 22'. Likewise, the shopping cart 20" (or, alternatively, the RFID reader 22") has an RF generator 30" that emits an RF field RF'' that extends to or beyond a readable range 35" of the contents of the shopping cart 30". When the RFID reader 22" in the shopping cart 20" detects the RF field generated by the RF generator 30' on the shopping cart 20', the RFID reader 22" refrains from reading any items into its electronic record 40". Likewise, when the RFID reader 22' in the shopping cart 20' detects the RF field generated by the RF generator 30" on the shopping cart 20" (or any other RF generator on any other shopping cart), the RFID reader 22' refrains from reading any items into its electronic record 40'. Such a configuration prevents the RFID reader in a first shopper's shopping cart from inadvertently detecting and reading items in a second shopper's cart, and vice-versa, which is desirable because supermarkets and shopping centers often have many shoppers and shopping carts at any given time. The shopping carts are not required to each have a different or unique RF field. Rather, even a single RF field could be chosen to designate the presence of a shopping cart, and all of the shopping carts (including carts 20' and 20") may be assigned that particular RF field, so long as it is configured to avoid picking up its own RF field and identifying it as an indication that another cart is present. Thus, the RF detector of any cart could detect the presence of any other cart by virtue of detecting the one RF field designated for all shopping carts. However, it may be desirable to provide a way for each cart to distinguish its own RF field from the RF fields of other carts. There are a number of ways to do this. One example would be for all the RF generators associated with the respective carts to send a 10 ms pulse out at regular or predefined intervals, such as once per second. The RF detector may then "listen" for 1 second, and if only the pulse of that RF detector is detected, the RF detector could determine that no other RF detector is in proximity (and therefore no other cart of items is in proximity) and that scanning is therefore permitted. This would allow the RF detector of one cart to distinguish its own RF signals from that of another cart, even if the RF signals of the different carts are otherwise essentially identical (e.g. have the same frequency and amplitude). The RF detector could perform a 2nd "listen" at the end of scanning to ensure that no cart came in range while the scanning was performed. This is analogous to the way Ethernet works. Other ways for the RF generator of a cart to distinguish its own RF signals from RF signals emitted by the RF generator of another cart will be apparent to one skilled in the art having benefit of this disclosure. An alternative way of distinguishing the RF field of one cart from that of other carts would be to generate different RF fields at each cart, such as by using different frequencies (channels) or different signal content in the RF field generated at each cart.

In any of the embodiments described above, the electronic record of shopping cart contents will not necessarily be a real-time listing of contents. However, the electronic record will be updated periodically as the shopper shops. For example, the RFID reader could be programmed to scan for items in a particular zone in response to leaving the RF field associated with that zone. Alternatively, the RFID reader could be programmed to scan periodically for items added to the shopping cart, such as several times per minute. In the case of a periodic or scheduled scanning for items, the RFID reader may scan for items that are in the cart and not previously entered into the electronic record, other than those items associated with any RF field that the RFID reader is currently within (if any). The contents may be updated often enough to provide a reasonably current accounting of items in the shopping cart, or at least to have a complete and accurate accounting of items in the shopping cart by the time the shopper reaches checkout to pay for the items. This will save time as compared to conventional shopping because the items will already have been scanned in and accounted for in the electronic record, as opposed to conventional systems wherein items are scanned in only at checkout. When the shopper is ready to checkout, the updated electronic record of shopping cart contents may be computer-analyzed to provide a total amount due and to request payment from the shopper.

While the shopper shops, and as the electronic record of shopping cart contents is updated, the items in the electronic record may be used to provide suggestive selling to the shopper. For example, the description of the selected items in the electronic record may be cross-referenced to related products offered by paid advertisers, and these related products may be suggested to the shopper, such as by displaying advertisements on an electronic display or providing computer-generated coupons to the shopper while shopping. A database of the related products may reside on a system network that includes the memory where the electronic record of a shopper's selected items is stored.

Figure 9:
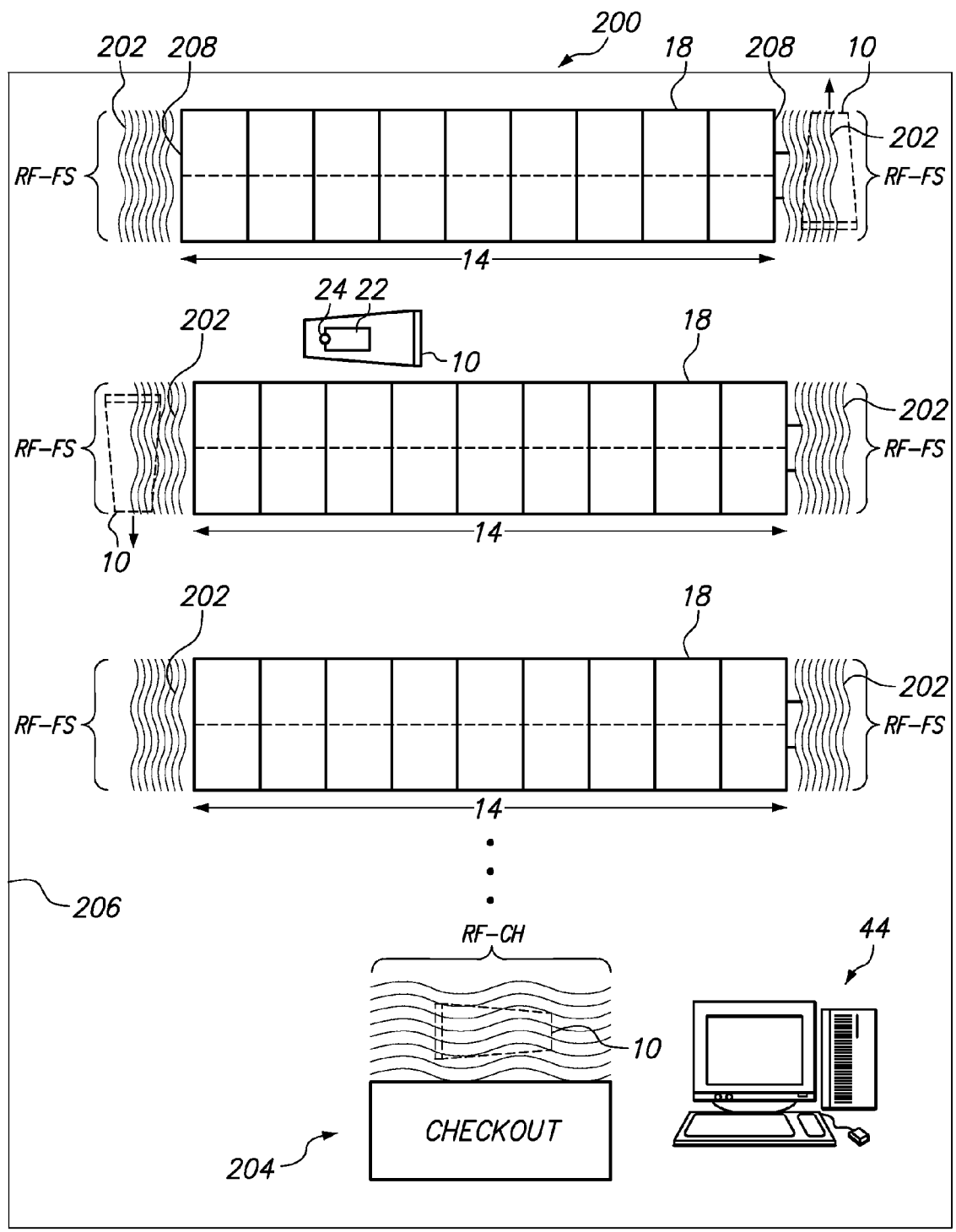
FIG. 9 is a plan view of a supermarket according to an embodiment of the invention having forced-scanning zones and a checkout zone.

FIG. 9 is a plan view of a supermarket 200 according to an embodiment of the invention having forced-scanning zones 202 with associated RF fields "RF-FS" and a checkout zone 204 having an associated RF field "RF-CH". The embodiments in connection with FIGS. 1-8 illustrated how a cart entering and leaving the RF field of an item zone could trigger the scanning of a cart to update items currently in the cart. The discussion of the embodiments in FIGS. 1-8 further included examples of verifications that could be performed, such as not scanning items from a particular item zone unless the cart had not only left the RF field of that item zone but also entered another RF field of another item zone. FIG. 9 illustrates a still further step that may be used to perform a forced scanning of the cart 10 when it enters any of the forced scanning zones 202. Here, the forced-scanning zones are optionally positioned in areas of the supermarket floor that are out of any RF field from the various item zones—specifically, the forced-scanning zones are placed adjacent to the ends 208 of supermarket shelves 18. As the cart 10 is moved around the store within the aisles 14, items may be scanned in periodically, as described above in connection with FIGS. 1-8. Then, whenever the cart 10 is moved out of the aisles 14, such as to bring the cart 10 to an adjacent aisle 14, the cart 10 is passed between the wall 206 and the ends 208 of the shelves 18. This forces (or at least encourages) movement of the cart 10 into the forced-scanning zones 202 and into RF fields RF-FS. The field RF-FS signals are detected by the RF detector 22 and communicated to the RFID reader 22 to cause the RFID reader to perform a scan. Thus, at least in the optional layout of FIG. 9, the RFID reader 22 will update the cart contents each time it reaches the end of one aisle 14 and moves to another aisle 14. This is useful, for example, to ensure that at the end of every aisle 14, the contents of the cart 20 get updated.

A final scanning may be signaled prior to checkout, when the cart 20 reaches the RF field RF-CH at the checkout zone 204. The checkout zone 204 may be positioned at every supermarket exit to ensure that no cart 20 leaves the supermarket 200 without first entering the checkout zone 204. The RF field RF-CH, detected by the RF detector 24 and communicated to the RFID reader 22, signals the RFID reader 22 to perform the final scan prior to checkout. At this point, the cart 10 may be very full of items. It is recognized that some RFID readers may not be able to penetrate a large load of items to reliably detect all the items in a full cart. However, due to the periodic scanning provided by the above embodiments, the final scan at the checkout zone 204 is likely to occur only after several or many intermediate scans were performed, as items were progressively added to the cart 20. The most recent items are likely to be on the outer perimeter of the cart load, such as on top of a pile of items in the cart 20. At this location, the items are very likely to be readable, regardless of how big the load of items in the cart 20 is. At the checkout zone 204, after the final scan has been performed, the computer 44 may be used to total the price of all the items in the cart 20 and process payment by the shopper prior to the shopper leaving the supermarket.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
    a first set of items positioned in a first item zone, each item in the first set of items having a machine-readable identification tag;
    an electronic tag reader capable of remotely reading the identification tags into an electronic record of shopping cart contents when the identification tags are within a readable range from the electronic tag reader;
    an energy field generator other than one of the machine-readable identification tags, the energy field generator configured to generate a first detectable energy field extending from a location within the readable range of at least some of the items in the first item zone to a location outside the readable range of any of the items in the first item zone; and
    wherein the tag reader is movable along the aisle into and out of the first detectable energy field, and is configured not to read the identification tags on any of the first set of items while the tag reader is within the first detectable energy field and, in response to the tag reader having been moved out of the first detectable energy field, to selectively read the identification tags on any of the items taken from the first item zone into the electronic record of shopping cart contents.

2. The system of claim 1, wherein the energy field generator is selected from the group consisting of an RF field generator configured for generating a detectable RF field, an acoustic energy field generator configured for generating a detectable acoustic energy field, and a magnetic field generator configured for generating a detectable magnetic field.

3. The system of claim 1, further comprising:
- a second set of items positioned in a second item zone spaced from the first item zone, each item in the second set of items having a machine-readable identification tag;
- wherein the detectable energy field generator is configured to generate a second detectable energy field extending from a location within the readable range of at least some of the items in the second item zone to a location outside the readable range of any of the items in the second item zone; and
- wherein the tag reader is movable into and out of the second detectable energy field, and is configured not to read the identification tags in the second item set into the electronic record of shopping cart contents while the tag reader is within the second detectable energy field and to selectively read the identification tags in the second item set into the electronic record of shopping cart contents when the tag reader is outside the second detectable energy field.

4. The system of claim 3, further comprising a shelf having a plurality of consecutively arranged item bins, including a first bin or region defining the first item zone and a second bin or region defining the second item zone.

5. The system of claim 4, further comprising a wire routed along the shelf and in electronic communication with the detectable energy field generator, wherein the detectable energy fields are generated from the wire.

6. The system of claim 2, wherein the first detectable energy field and second detectable energy field do not intersect within the detectable resolution of the tag reader.

7. The system of claim 1, further comprising a wire routed in proximity to the first item zone and in communication with the detectable energy field generator, wherein the detectable energy field extends less than about four feet beyond the set of items.

8. The system of claim 1, further comprising a movable shopping cart, wherein the tag reader is connected to the shopping cart.

9. The system of claim 8, further comprising:
- a second shopping cart having a detectable energy field generator for generating an detectable energy field extending a distance from the second shopping cart, wherein the tag reader is configured not to read identification tags if the tag reader is receiving the detectable energy field from the second shopping cart.

10. The system of claim 1, wherein the tag reader is configured to read into the electronic record of shopping cart contents the identification tag of each item from the first item zone that is within the readable range in response to moving from inside the detectable energy field to outside the detectable energy field.

11. The system of claim 1, further comprising:
- a forced-scanning zone spaced from the item zones, wherein the energy field generator is configured to generate a detectable energy field in the forced-scanning zone distinct from the first detectable energy field, and wherein the tag reader is configured to read the identification tags into the electronic record of shopping cart contents in response to entering the detectable energy field in the forced-scanning zone.

12. A method, comprising:
- positioning a first set of items in a first item zone, each item in the first set of items having a machine-readable identification tag;
- generating a first detectable energy field other than from any of the machine-readable identification tags, the first detectable energy field extending from a location within the readable range of at least some of the items in the first item zone to a location outside the readable range of any of the items in the first item zone;
- moving the tag reader along the aisle into the first detectable energy field, and not reading the identification tags on any of the first set of items while the tag reader is within the first detectable energy field; and
- moving the tag reader out of the first detectable energy field, and, in response to the tag reader having been moved out of the first detectable energy field, selectively reading the identification tags on any of the items taken from the first item zone into the electronic record of shopping cart contents.

13. The method of claim 12, wherein generating the first detectable energy field comprises generating a detectable RF field, generating a detectable acoustic energy field, or generating a detectable magnetic field.

14. The method of claim 12, further comprising:
- positioning a second set of items in a second item zone spaced from the first item zone, each item in the second set of items having an associated machine-readable identification tag;
- generating a second detectable energy field extending from a location within the readable range of at least some of the items in the second item zone to a location outside the readable range of any of the items in the second item zone; and
- moving the tag reader into the second detectable energy field, not reading the identification tags in the second item set into the electronic record of shopping cart contents while the tag reader is within the second detectable energy field, moving the tag reader along the aisle out of the second detectable energy field, and selectively reading the identification tags in the second item set into the electronic record of shopping cart contents when the tag reader is outside the second detectable energy field.

15. The method of claim 14, further comprising positioning the first item set in a first bin defining the first item zone on a shelf and positioning the second item set in a second bin defining the second item zone on the shelf.

16. The method of claim 15, further comprising providing a wire routed along the shelf and in electronic communication with the detectable energy field generator, and generating the detectable energy fields from the wire.

17. The method of claim 14, further comprising generating the first detectable energy field and second detectable energy field such that they do not intersect.

18. The method of claim 12, further comprising routing a wire in proximity to the first item zone and in communication with the detectable energy field generator, and generating the detectable energy field less than about four feet from the wire into the aisle.

19. The method of claim 12, wherein the tag reader is disposed in a shopping cart movable along the aisle.

20. The method of claim 19, further comprising:
- generating an detectable energy field extending a distance from the second shopping cart; and
- receiving the detectable energy field from the second shopping cart at the first shopping cart, and not reading the identification tags in the first item set while the tag reader is receiving the detectable energy field from the second shopping cart.

* * * * *